(12) United States Patent
Vaught et al.

(10) Patent No.: US 6,385,359 B1
(45) Date of Patent: May 7, 2002

(54) SUBMOUNTLESS INTEGRATED OPTICS CHIP PACKAGE

(75) Inventors: Jesse A. Vaught, Phoenix; Karl A. Fetting, Glendale; Henry H. Hung, Paradise Valley; John H. Shannon, Scottsdale, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/223,088

(22) Filed: Dec. 29, 1998

(51) Int. Cl.$^7$ .................................................. G02B 6/12
(52) U.S. Cl. ........................................................ 385/14
(58) Field of Search ................................ 385/14, 8–13

(56) References Cited

U.S. PATENT DOCUMENTS

| | | | | |
|---|---|---|---|---|
| 3,757,955 A | * | 9/1973 | Leonard | 210/321 |
| 4,424,174 A | * | 1/1984 | Howarth | 264/1.5 |
| 5,214,726 A | * | 5/1993 | Hockaday | 385/14 |
| 5,479,548 A | * | 12/1995 | Cote et al. | 385/51 |
| 5,673,345 A | * | 9/1997 | Saito et al. | 385/49 |
| 5,875,545 A | * | 3/1999 | DiStefano et al. | 29/840 |

OTHER PUBLICATIONS

Craig T. Herdman, *Fiber–Optic Gyroscopes*; Scientific Honeyweller; 1996 pp. 1–10.
UTP Catalog "Fiber Optic Gyro Circuits" pp. 21–22, 26.

* cited by examiner

*Primary Examiner*—Frank G. Font
*Assistant Examiner*—Michael P. Mooney
(74) *Attorney, Agent, or Firm*—John G. Shudy

(57) ABSTRACT

An Integrated Optics Chip (IOC) package for an IOC, including a base having an upper support surface having a first raised surface and a dielectric gel disposed on the first raised surface of the base and adapted to couple to the IOC. The dielectric gel is sufficiently compliant to minimize stresses from structural changes in the base, accommodate a thermal mismatch between the IOC and the base, and reduce vibration. A first adhesive may be applied to a platform integral to the base that is sufficiently rigid to prevent the IOC from separating from the dielectric gel during vibration. A second adhesive may be applied on a second raised surface of the base to provide strain relief to the leads of the IOC. Advantages include the elimination of several components and manufacturing steps, improved strain relief and vibration dampening, as well as manufacturing time and cost savings.

2 Claims, 3 Drawing Sheets

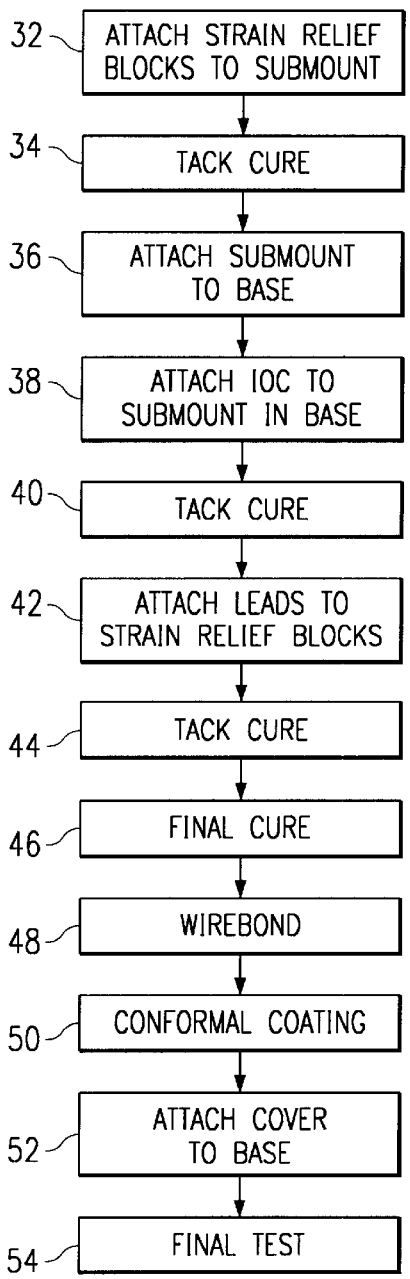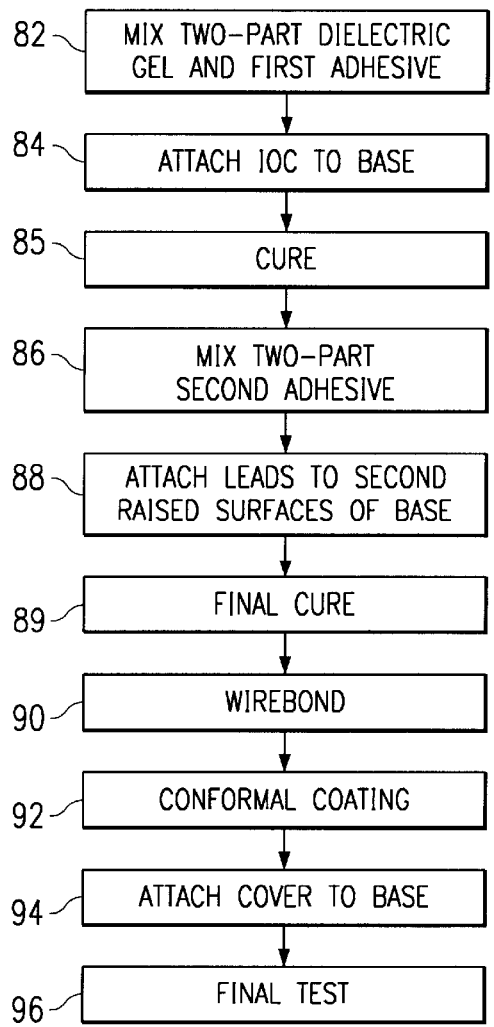

SUBMOUNTLESS INTEGRATED OPTICS CHIP PACKAGE

The United States Government has acquired certain rights in this invention pursuant to Contract No. DAAH01-95-C-R147 awarded by the U.S. Army Aviation Missile Command.

TECHNICAL FIELD

This invention relates generally to packaging integrated circuits, and more particularly to a submountless integrated optics chip package and method of packaging for use in a fiber optic gyroscope. The government of the United States of America may have rights to this invention.

BACKGROUND OF THE INVENTION

A gyroscope is an instrument commonly used in navigation systems of transportation vehicles, satellites, and communications systems to sense motion with respect to a known starting point by measuring rotation about an axis. Mechanical gyroscope designs implementing spinning flywheels suspended in gimbals are being replaced in modern designs by optical gyroscopes, which have light waves circulating around a closed path. One type of optical gyroscope, the fiber optic gyroscope, typically utilizes an Integrated Optic Chip (IOC) made of lithium niobate ($LiNbO_3$) to split and modulate the laser light. The IOC may comprise other materials such as silicon, for example, and are typically housed in a package before being assembled into a gyroscope or other device.

Several design aspects must be considered in order to preserve the physical integrity of the Integrated Optic Chip (IOC), as well as its performance characteristics, when packaging the IOC. First, the IOC itself must experience minimal strain during temperature cycling and vibration. Second, the interface for the optic fiber attached (pigtailed) to the chip must also experience minimal strain. Third, the electrical connections that are wire bonded must be held rigid, either permanently or temporarily, to accommodate the wire bonding process. It is also desirable that an IOC package and method of packaging have a low cost and ease of assembly.

SUMMARY OF THE INVENTION

The present invention achieves technical advantages as a submountless IOC package and further including a method of packaging an IOC, by attaching an IOC to the package base with a dielectric gel. The components of a submount and strain relief blocks, and several processing steps of prior art packages are eliminated with the present invention, resulting in time and cost savings.

In one embodiment, disclosed is an Integrated Optics Chip (IOC) package for an IOC, including a base having an upper support surface with a first raised surface. A dielectric gel is disposed on the first raised surface of the base. The dielectric gel is adapted to couple to the IOC, and the dielectric gel is sufficiently compliant to minimize stresses from structural changes in the base, accommodate a thermal mismatch between the IOC and the base, and reduce vibration. A first adhesive may be applied to a platform integral to the base that is sufficiently rigid to prevent the IOC from separating from the dielectric gel during vibration.

In another embodiment, disclosed is an Integrated Optics Chip (IOC) package, including a base having a mounting surface with a first raised surface. A dielectric gel is disposed on the first raised surface of the base. An IOC is coupled to the base via the dielectric gel, where the dielectric gel is sufficiently compliant to minimize stresses from structural changes in base, accommodate a thermal mismatch between IOC and base, and reduce vibration. A first adhesive may be applied to a platform integral to the base that is sufficiently rigid to prevent the IOC from separating from the dielectric gel during vibration.

Also disclosed is a method of packaging an Integrated Optics Chip (IOC), the method including the step of providing a base, where the base has an upper support surface with a first raised surface. The method also includes the step of attaching the IOC to the first raised surface of the base with a dielectric gel, where the dielectric gel is sufficiently compliant to minimize stresses from structural changes in the base, accommodate a thermal mismatch between the IOC and the base, and reduce vibration. The attaching step may further include attaching the IOC to a platform of the base via a first adhesive, where the first adhesive is sufficiently rigid to prevent the IOC from separating from the dielectric gel during vibration.

BRIEF DESCRIPTION OF THE DRAWINGS

The above features of the present invention will be more clearly understood from consideration of the following descriptions in connection with accompanying drawings in which:

FIG. 3 shows a process flow chart for a prior art IOC package;

FIG. 6 shows a process flow chart for the present invention.

Corresponding numerals and symbols in the different figures refer to corresponding parts unless otherwise indicated.

DETAILED DESCRIPTION OF PREFERRED EMBODIMENTS

The following is a description of the structure and method of the present invention. A prior art package will be discussed first, followed by a description of a preferred embodiment of the present invention, and a discussion of alternatives and advantages.

Figure 1:
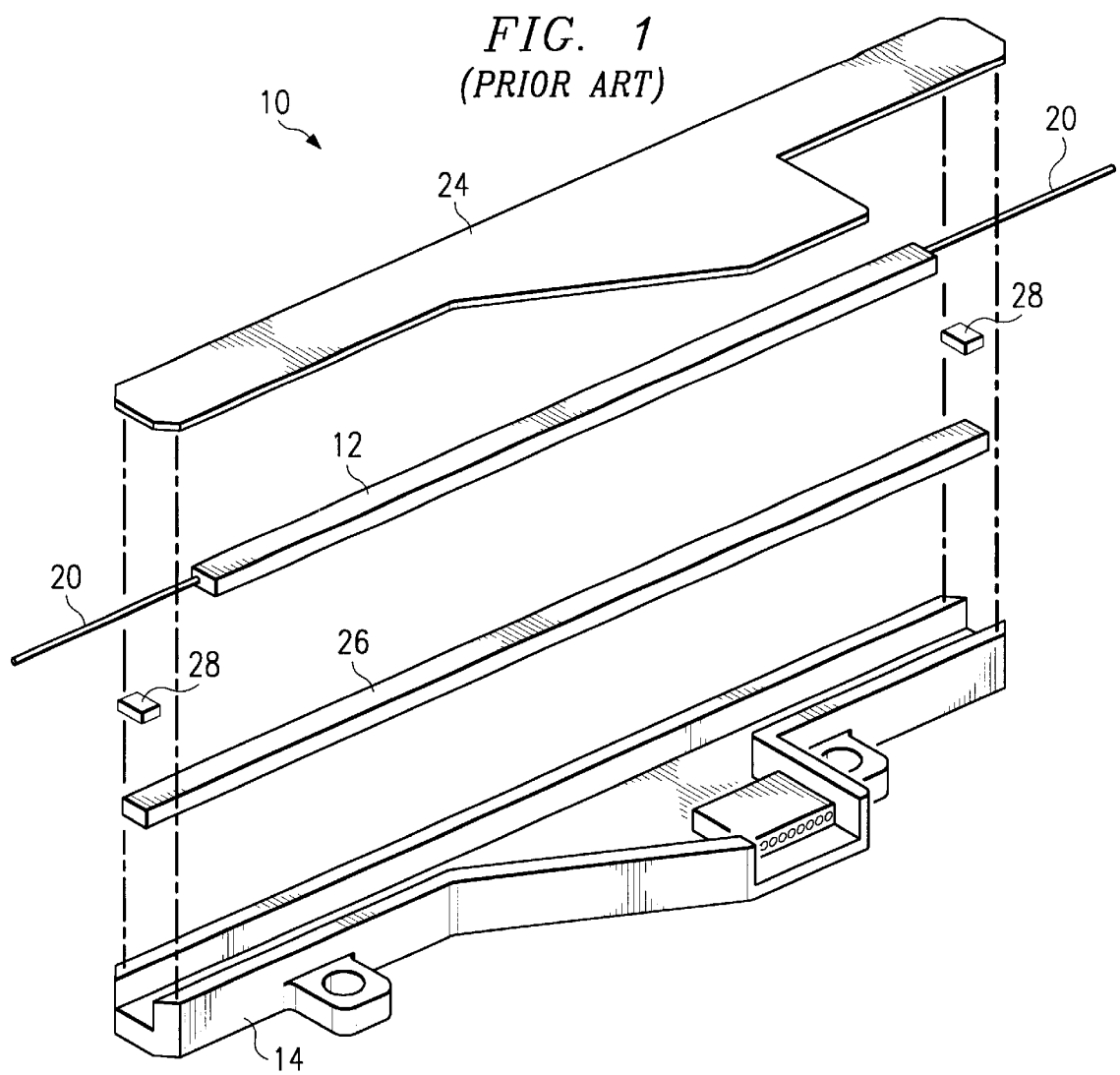
FIG. 1 illustrates three dimensional perspective view of a prior art IOC package.
Figure 2:
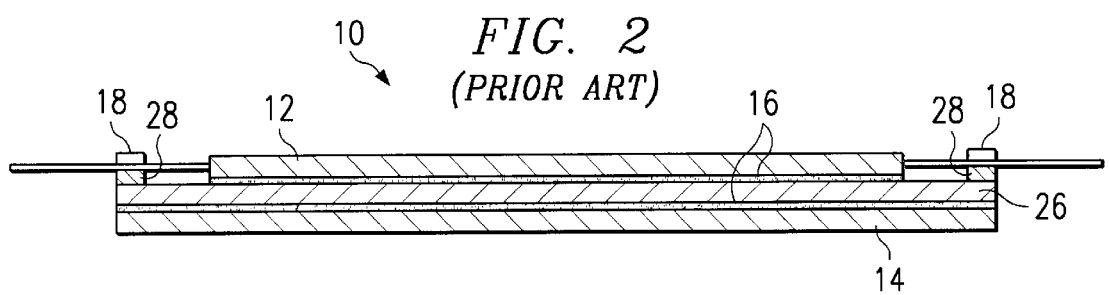
FIG. 2 illustrates a cross-sectional view of the prior art IOC package of FIG. 1.

FIGS. 1 and 2 show a perspective view and cross-sectional view, respectively, of a prior art IOC package 10 having a base 14 and a submount 26 attached to the base 14 by epoxy 16. The base 14 may comprise Kovar, and the submount 26 may comprise $LiNbO_3$, for example. Strain relief blocks 28 provide strain relief and mechanical support for fiber optic leads 20 of the pigtailed IOC 12 and are attached with an adhesive such as epoxy, not shown. The leads 20 are attached to the strain relief blocks by RTV 18. The submount 26 mounts flush against the inside surface of the base 14. A cover 24 typically comprising Kovar or material matching the material of the base 14 is mounted over the structure with an adhesive, such as epoxy, for example.

FIG. 3 illustrates a conventional process flow chart 30 for the manufacturing of the IOC package 10. First, the strain relief blocks 28 are attached to the submount 26 (step 32) with an adhesive (not shown), which is cured with a tack cure (step 34). Then, the submount 26 is attached to the base 14 with a epoxy 16 (step 36). The IOC is attached to the submount 26 also with an epoxy 16 (step 38), and a tack cure is performed (step 40) to temporarily set the epoxy 16. The fiber optic leads 20 are attached to the strain relief blocks 28 with an adhesive (step 42), and another tack cure is performed (step 44). The tack cure steps (34, 40, 44) typically comprise exposing the epoxy to a. UV light. A final cure is then performed (step 46) in order to complete the curing process of each of the adhesives (epoxy 16 and RTV 18) used in the packaging system. Next, the electrical connections are wirebonded to the package (step 48), the IOC 12 is conformal coated (step 50), a cover 24 is attached to the package 10 (step 52), and a final test is performed (step 54).

A problem with the prior art IOC package 10 shown in FIGS. 1 and 2 is that the method of packaging is labor-intensive and the package contains many components. For example, several attachment steps are required involving adhesives, with each attachment step requiring a tack cure step followed by a final cure step (step 46). The touch-time associated with the making of the submount 26, and strain relief block 28 increases the costs associated with manufacturing the package. The prior art process shown in FIG. 3 requires a great deal of time to manufacture and subsequently is expensive. Furthermore, the rigidity of the adhesives used in the prior art vary substantially over temperature. A packaging technique for IOCs is needed that has reduced cost and assembly time, and better thermal, structural, and vibrational isolation. Also desired is a packaging design with a reduced number of components in the assembly.

Figure 4:
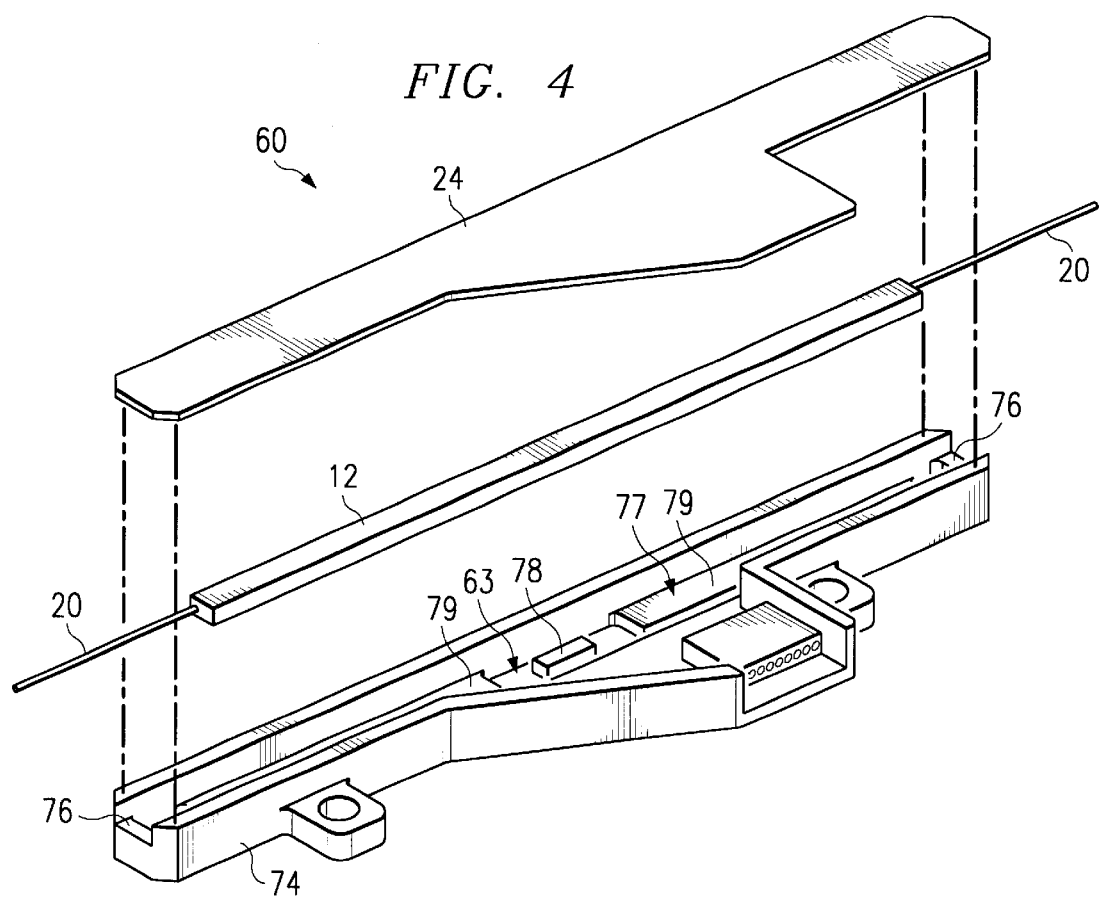
FIG. 4 shows an exploded three dimensional perspective view of an embodiment of the present invention.
Figure 5:
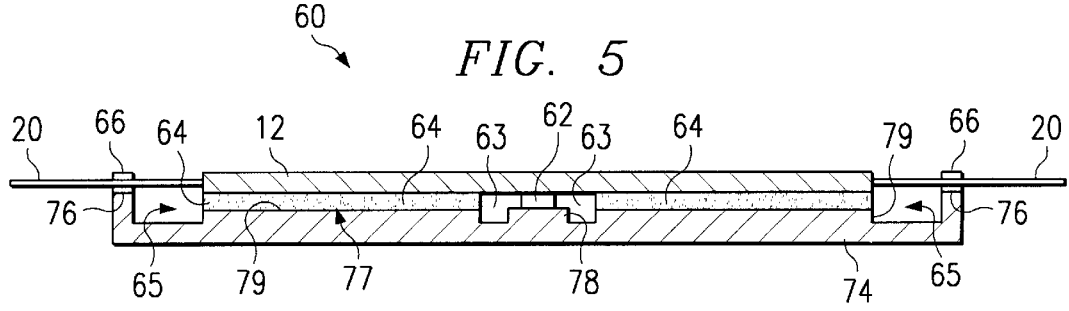
FIG. 5 shows cross-sectional diagram of the present invention.

The present invention achieves technical advantages and solves the problems of the prior art by providing an IOC package 60 not requiring a submount 26 and strain relief blocks 28 of the prior art. FIG. 4 illustrates an exploded three dimensional perspective view of the IOC package 60 of the present invention, and FIG. 5 illustrates a cross-sectional view of package 60. The present invention comprises a base 74 preferably comprised of stainless steel having an upper support surface generally shown at 77 with a raised surface 79 integral to the base 74. A dielectric gel 64 is applied to and uniformly covers the first raised surface 79 as shown in FIG. 5, the dielectric gel 64 being used to adhere the IOC 12 to the base 74. The dielectric gel is sufficiently compliant so as to minimize stresses from structural changes in the base 74 and accommodate a thermal mismatch between the IOC 12 and the base 74. The dielectric gel 64 is also sufficiently compliant to reduce vibration from external sources.

In environments having little vibration but a wide range of temperatures, the dielectric gel 64 alone of the IOC package 60 may provide sufficient adhesion of the IOC 12 to the base 74 of the package 60. However, in more challenging mechanical environments, further adhesion is required. FIGS. 4 and 5 illustrate an elevated central platform 78 which is integral to the base 74. In an embodiment of the present invention, a first adhesive 62 is applied to the platform 78 which securely couples the IOC 12 to the base 74. While both the dielectric gel 64 and the first adhesive 62 adhere the base to the IOC, the dielectric gel 64 primarily provides mechanical float and accommodates thermal mismatch between IOC 12 and base 74, as well as dampens vibrations of the IOC 12 within the package 60. The first adhesive 62 is sufficiently rigid and is adhered to IOC 12 to prevent the IOC 12 from separating from the dielectric gel 64 during vibration. The dielectric gel 64 provides float from thermal strains and dampens vibration. Preferably, the first adhesive 62 is applied over a sufficiently small surface area of the platform 78 relative to the surface area of the raised surface 79 having the dielectric gel 64 so that thermal stress to the IOC 12 is minimized. The dielectric gel 64 preferably comprises Dow Corning Q3-6575 gel, and the first adhesive 62 is preferably a rigid epoxy such as EPO-TEK 353ND.

Preferably, the dielectric gel 64 and the first adhesive 62 are physically isolated from one another, for example, by a recess 63 defined in base 74, as shown in FIG. 5, to control the adhesive bond area and prevent the IOC 12 from fracturing during vibration and thermal cycling. Physically isolating the dielectric gel 64 and first adhesive 62 also prevents them from mixing, preventing any interactions prior to cure. Limiting the surface area of the epoxy minimizes the surface area subjected to thermal stress due to differential thermal expansion. Preferably, the platform 78 is narrower than the IOC 12, in order to prevent the first adhesive 62 from wicking up the sides of the IOC 12, which may cause fractures. Rather, it is desired that the first adhesive remain on the bottom surface of the IOC 12.

The IOC 12 typically comprises fiber optic leads 20 emerging from either end of the IOC 12. The base 74 preferably comprises a second raised surface 76 near each of the base ends for supporting the leads 20 and for attachment thereto. The leads 20 are coupled to the second raised surfaces of the base 74 by a second adhesive 66, thereby strain-relieving the leads 20 with the second adhesive 66. The second adhesive is preferably an RTV, and more preferably the RTV comprises Dow Corning Sylgard 577. Each of the second raised surfaces 76 of the base 74 are preferably isolated from the first raised surface 79, for example, by a recess 65 integrally formed in base 74, further providing strain relief to the leads 20 of the IOC 12. The recess 65 also prevents the second adhesive 66 from mixing with the dielectric gel 64. A cover 24 is securely placed over the entire assembly as shown in FIG. 4, to provide the completed IOC package 60. The first and second adhesives 62 and 66 and the dielectric 64 may comprise two-part adhesives that require mixing prior to application.

A process flow 80 according to a preferred embodiment of the present invention is shown and described in FIG. 6. The two part dielectric gel 64 and first adhesive 62 are mixed (step 82), and the IOC 12 is attached to the base 74 (step 84) using the dielectric gel 64 and first adhesive 62. Next, a cure step is performed (step 85) to hold the IOC 12 in place during the subsequent steps. The cure step 85 preferably comprises curing the dielectric gel 64 and the first adhesive 62 in an oven for 90 degrees C for 30 minutes, for example. The base 74 is allowed to cool, the two part second adhesive 66 is mixed (step 86) and the leads 20 are attached to the second raised surfaces 76 of the base 74 using the second adhesive 66. Next, a final cure of the first and second adhesives 62 and 66 and dielectric gel 64 is performed (step 89), preferably around 90 degrees C until cured, for approximately two and one-half hours, for example. Next, a wire-bonding step 90, conformal coating step 92, cover attachment step 94, and final test 96 are performed.

In a preferred embodiment, the first adhesive 62 comprises EPO-TEK 353ND, dielectric gel 64 comprises Dow Corning Q3-6575 gel, and the second adhesive 66 comprises Dow Corning Sylgard 577. These three materials have been selected so that they may be cured simultaneously, at generally the same time and temperature, with the use of an alignment fixture that holds the assembly in place until the final cure step 89, eliminating the need for a cure step 85. It is contemplated that the first and second adhesives 62 and 66 and dielectric gel 64 may be cured at room temperature, eliminating the need for a cure step 85 and final cure step 89 completely. It is also contemplated that if subsequent temperature cycling will be performed on the IOC package after assembly or the IOC package will be allowed to cure at room temperature, then the time required for final cure step 89 may be reduced accordingly. The time and temperature of the cure steps 85 and 89 of the present invention may vary, and manufacturer=s cure schedules may be referenced in order to determine the required cure time and temperature.

The novel method and IOC package 60 of the present invention provides the advantages of reduced assembly components, reduced assembly times, improved strain relief and improved thermal mismatch accommodation for the IOC 12. The strain relief for the leads 20 is provided by the second raised surface 76, eliminating the need for the strain relief blocks 28 of the prior art. The dielectric gel 64 and the first adhesive 62, as well as first raised surfaces 79 and platform 78 integral to the base 74 eliminate the need for the submount 26 of the prior art. A further advantage of the present invention is that the first and second adhesives 62 and 66, as well as the dielectric gel 64, may be selected so that they may be cured simultaneously, at generally the same time and temperature, eliminating a cure step 85. The first and second adhesives 62 and 66 and dielectric gel 64 work synergistically to provide adequate adhesion, strain relief and vibration dampening for the various components of the package.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the packaging technique disclosed herein may be used with other integrated circuit devices. Other materials may be used for the various components; for example, the base 74 may comprise other materials than stainless steel, such as Kovar. It is therefore intended that the appended claims encompass any such modifications or embodiments.

What is claimed is:

1. An Integrated Optics Chip (IOC) package for an IOC, comprising:
   a base comprising an upper support surface having a first raised surface, said upper support surface comprising a platform;
   a dielectric gel disposed on said first raised surface of said base and adapted to couple to said IOC, wherein said dielectric gel is sufficiently compliant to minimize stresses from structural changes in said base, accommodate a thermal mismatch between said IOC and said base, and reduce vibration;
   a first adhesive disposed on said platform and adapted to couple said IOC;
   means for isolating said dielectric gel and said first adhesive comprising a recess defined in said upper support surface of said base between said dielectric gel and said first adhesive.

2. A method of packaging an Integrated Optics Chip (IOC), comprising the steps of:
   providing a base having an upper support surface comprising a first raised surface, said upper surface of said bases comprising a platform,
   attaching said IOC to said first raised surface of said base with a dielectric gel that is sufficiently compliant to minimize stresses from structural changes in said base, accommodate a thermal mismatch between said IOC and said base and reduce vibration;
   attaching said IOC to said platform of said base via a first adhesive is sufficiently rigid to prevent said IOC from separating from said platform during vibration; and
   isolating said dielectric gel from said first adhesive by defining a recess in said upper support surface of said base between said dielectric gel and said first adhesive.

\* \* \* \* \*